(12) United States Patent
Petto

(10) Patent No.: US 9,027,484 B2
(45) Date of Patent: May 12, 2015

(54) FRONT-ARRANGEMENT FOR A VEHICLE, IN PARTICULAR FOR A RAIL VEHICLE, COMPRISING A SCREEN CLEANING DEVICE

(71) Applicant: Bombardier Transportation GmbH, Berlin (DE)

(72) Inventor: Michael Petto, Vienna (AT)

(73) Assignee: Bombardier Transportation GmbH, Berlin (DE)

( * ) Notice: Subject to any disclaimer, the term of this patent is extended or adjusted under 35 U.S.C. 154(b) by 171 days.

(21) Appl. No.: 13/659,138

(22) Filed: Oct. 24, 2012

(65) Prior Publication Data

US 2013/0284047 A1    Oct. 31, 2013

(30) Foreign Application Priority Data

Oct. 25, 2011    (DE) .......................... 10 2011 085 163

(51) Int. Cl.
*B61D 15/06*    (2006.01)
*B60S 1/04*    (2006.01)
*B60S 1/34*    (2006.01)
(Continued)

(52) U.S. Cl.
CPC .............. *B61D 17/00* (2013.01); *B60S 1/0433* (2013.01); *B60S 1/0463* (2013.01); *B60S 1/3406* (2013.01); *B60S 1/3409* (2013.01); *B61D 15/06* (2013.01); *B61D 17/06* (2013.01); *Y02T 30/30* (2013.01)

(58) Field of Classification Search
CPC ........ B61D 15/06; B61D 17/00; B61D 25/00; B61D 17/06; B60S 1/0488; B60S 1/04; B60S 1/349; B60S 1/34; B60S 1/0452; B60S 1/0441; B60S 1/0438; B60S 1/043; B60S 1/0433; B60S 1/0458; B60S 1/0463; B60S 1/3406; B60S 1/3409; B60S 1/3488; Y02T 30/30
USPC ...................................................... 105/392.5
See application file for complete search history.

(56) References Cited

U.S. PATENT DOCUMENTS 3,869,164 A    3/1975    Schwenk
5,271,120 A    12/1993    Eustache et al.
5,337,439 A    8/1994    Frey et al.
(Continued)

FOREIGN PATENT DOCUMENTS

DE    2163046    6/1973
DE    2218927    10/1973
(Continued)

OTHER PUBLICATIONS http://www.knorr-bremse.com/media/documents/railvehicles/en/en_neu_2010/WindscreenWiper.pdf.

*Primary Examiner* — Zachary Kuhfuss
(74) *Attorney, Agent, or Firm* — The Webb Law Firm

(57) ABSTRACT

A front arrangement for a rail vehicle comprising a crash element with a forward facing crash surface, and a windshield washer device which, in turn, comprises a drive device and a front window wiper device drivable by said drive device. The crash element includes at least one impact absorbing element. The windshield washer device is fastened to the crash element for the vehicle, and is movable relative to a support of the front arrangement and thus, movable relative to the load-bearing construction of the vehicle so as to move backward during the occurrence of the impact forces and to enable absorption of the acting impact energy by the impact absorbing element.

9 Claims, 3 Drawing Sheets

Figure 1:
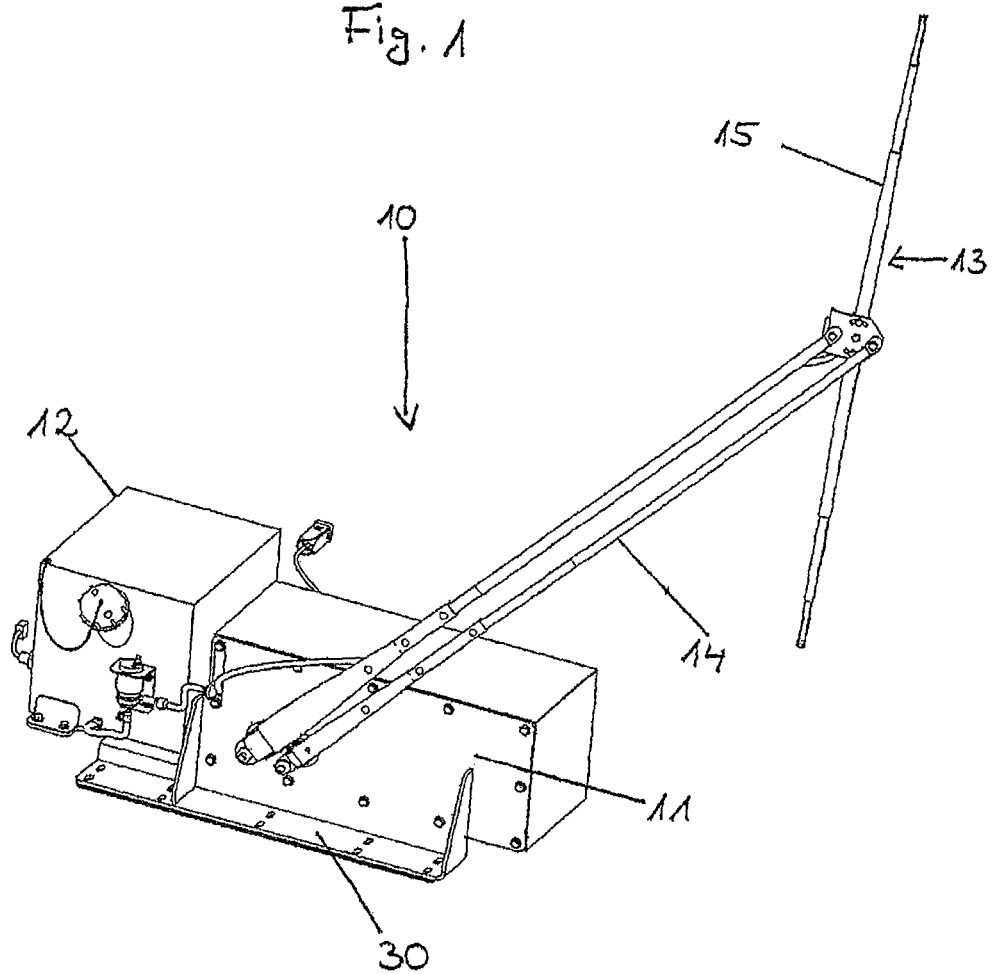

(51) Int. Cl.
  *B61D 17/00* (2006.01)
  *B61D 17/06* (2006.01)

(56) References Cited

U.S. PATENT DOCUMENTS

| | | | |
|---|---|---|---|
| 6,505,376 B1 * | 1/2003 | Kagawa | 15/250.31 |
| 6,769,733 B2 * | 8/2004 | Seksaria et al. | 296/192 |
| 6,854,154 B2 * | 2/2005 | Masuda | 15/250.31 |
| 2008/0244856 A1 | 10/2008 | Egner-Walter et al. | |

| | | | | |
|---|---|---|---|---|
| 2012/0325108 A1 * | 12/2012 | Graf et al. | | 105/392.5 |

FOREIGN PATENT DOCUMENTS

| | | | | |
|---|---|---|---|---|
| DE | 4037707 C1 | | 5/1992 | |
| DE | 19921930 A1 | | 1/2000 | |
| DE | 69816961 T2 | | 7/2004 | |
| DE | 102008053768 A1 | | 4/2010 | |
| DE | 102011121401 | * | 6/2013 | B60R 21/34 |
| EP | 1748916 A0 | | 12/2005 | |
| JP | 200095069 A | | 4/2000 | |

* cited by examiner

FRONT-ARRANGEMENT FOR A VEHICLE, IN PARTICULAR FOR A RAIL VEHICLE, COMPRISING A SCREEN CLEANING DEVICE

The invention relates to a front arrangement for a vehicle, in particular for a rail vehicle, e.g. a streetcar, said front arrangement having a windshield washer device, to a vehicle having such a front arrangement, to a method for fabricating such a front arrangement, and to a method for operating a vehicle, in particular a rail vehicle, e.g., a streetcar.

Known windshield washer systems for rail vehicles comprise the components drive device, water container, wiper arm and wiper blade. The drive device is usually accommodated in a waterproof housing. Wiper arm and wiper blade form the wiper device which is arranged below the front window. The water container containing the cleaning agent can be arranged remote from the wiper device and the drive device.

Windshield washer devices are typically arranged below the windshield (front window). However, a windshield washer system can also be provided for the rear window of the vehicle. Thus, a front arrangement for a vehicle is also to be understood as an arrangement arranged or arrangeable on the rear end of the vehicle. It is to be noted that at least in the case of rail vehicles, the driving direction can be reversed.

According to the prior art, the components of the windshield washer system such as drive device, water container and wiper device are at least partially fastened on the vehicle body or on load-bearing parts of the vehicle. Thus, for example, DE 199 21 930 A1 describes a windshield washer system in which the windshield washer device is fastened to the vehicle body.

In the event of a collision of a rail vehicle with a body, in particular another vehicle, the windshield washer device can already be damaged or irreparably destroyed during a crash at low driving speed. The rail vehicles are often designed such that the load-bearing construction (i.e. vehicle body) can withstand collisions at low driving speeds up to ca. 6 km/h without being damaged; however, it is often necessary to replace the windshield washer device even after such a "low-speed-crash". In unfavorable cases, the wind shield washer device can in addition damage or destroy the front window. This applies in particular to modern streetcars in which the driver has a sitting position very close to the front end of the rail vehicle so that through the front window, the driver can see obstacles or persons which are situated at very short distances in front of the vehicle. Instead of the buffers which were commonly used in the past and which protrude relatively far from the vehicle front, modern street cars usually have a bumper bar which extends at the front of the vehicle from the one side to the other side and which has a crash surface on its front side, which crash surface absorbs impact forces during a respective impact (in particular during a collision with a similar vehicle) and transfers said forces. Here, the bumper bar is connected to the load-bearing construction of the vehicle via impact absorbing elements. At the already mentioned driving speeds up to approx. 6 km/h, the impact absorbing elements can absorb the impact energy acting solely on the bumper bar. Depending on the configuration of the arrangement with impact absorbing elements, a reversible and/or irreversible deformation of the impact absorbing elements takes place.

It is an object of the invention to provide a front arrangement for a vehicle, in particular for a rail vehicle, e.g. a street car, said front arrangement having a windshield washer device which, at least during collisions of the rail vehicle at low driving speeds, can be protected from damage or destruction. It is another object to propose a vehicle comprising such a front arrangement, to propose a method for producing such a front arrangement, and a method for operating a vehicle, in particular a rail vehicle, e.g., a streetcar.

In order to achieve the object it is proposed to couple the windshield washer device with an crash element at the front of the vehicle or for the front of the vehicle and therefore, due to the movement of the crash element during the action of impact forces, to enable at least parts of the windshield washer device to move away from the colliding body or object. This is based on the knowledge that the crash element transmits the impact forces to at least one impact absorbing element, and the impact energy is absorbed by the impact absorbing element during the movement of the crash element. The invention is therefore based on the idea to fasten the windshield washer device to a crash element of the rail vehicle in such a manner that at least parts of the device are not subjected to impact forces during a collision of the vehicle and thus can be protected from damage or destruction because due to the collision-related movement of the crash element, these parts can be brought into a protected position.

The windshield washer device comprises in particular a drive device and a wiper device connected to said drive device, and optionally also at least one liquid container. In particular, the drive device and optionally a gear unit for transmitting the driving force to the wiper arm and/or the at least one liquid container is/are brought into the protected position.

In particular, proposed is a front arrangement for a vehicle, in particular for a rail vehicle, e.g. a streetcar, wherein the front arrangement comprises a crash element with a forward facing crash surface, and a windshield washer device which, in turn, comprises a drive device and a front window wiper device drivable by the drive device, wherein the crash element is configured so as to absorb and transfer impact forces during a crash of a body, in particular of another vehicle, onto the front of the vehicle and thus onto the crash surface of the crash element, and wherein the crash element is coupled with at least one impact absorbing element. The windshield washer device is fastened to the crash element for the vehicle, wherein the crash element and the windshield washer device fastened thereto are movable relative to a support of the front arrangement and thus, in a state installed in the vehicle, are movable relative to the load-bearing construction of the vehicle so as to move backward during the occurrence of the impact forces and to enable absorption of the acting impact energy by the at least one impact absorbing element.

Furthermore, a vehicle is proposed, in particular a rail vehicle such as, e.g., a streetcar, wherein the front arrangement is arranged in a front region of the vehicle and is connected to the load-bearing construction of the vehicle via the support of the front arrangement, and wherein in the direction opposite the driving direction, viewed from the drive device, a free space is available into which—upon occurrence of the impact forces on the crash surface—the drive device diverts.

Moreover, proposed is a method for fabricating a front arrangement for a vehicle, in particular for a rail vehicle, e.g. a streetcar, the method comprising the following steps:

providing a windshield washer device which has a drive device and a front window wiper device drivable by said drive device, providing a crash element with a crash surface, wherein the crash element is configured so as to absorb and transfer impact forces during a crash of a body, in particular of another vehicle, onto the front of the vehicle and thus onto the crash surface of the crash element, coupling the crash element with at least one impact absorbing element, fastening the windshield washer device to the crash element for the vehicle, and configuring the crash element and the windshield washer device fastened thereto as a unit movable relative to a support of the front arrangement and thus, in a state installed in the vehicle, movable relative to the load-bearing construction of the vehicle so as to move backward during the occurrence of the impact forces and to enable absorption of the acting impact energy by the at least one impact absorbing element.

Furthermore, the scope of the invention includes a method for operating a vehicle, in particular a rail vehicle, e.g., a streetcar, wherein:

during a crash of a body, in particular of another vehicle, impact forces acting onto the front of the vehicle and thus onto the crash surface of a crash element of the vehicle are absorbed by the crash element and are transferred to at least one impact absorbing element coupled with the crash element, wherein the crash element moves toward the at least one impact absorbing element, the movement of the crash element is transmitted to a windshield washer device of the vehicle which comprises a drive device and a front window wiper device drivable by said drive device so that at least the drive device and further parts of the windshield washer device are moved away from the body.

Thus, in a preferred configuration of the windshield washer device it is provided that in the case of an impact-related force application onto the crash surface of the crash element, the drive device and the liquid container can be moved into a free space of a component. Said component involves a part of the load-bearing construction of the vehicle, for example the front girder which, in the driving direction, is arranged behind the crash element. During a collision-related movement of the crash element in the direction of the longitudinal axis of the vehicle, parts of the windshield washer device attached thereon are displaced into a free space which is located behind said parts and which is formed by the front girder. At this position, the front girder is formed as a housing-like component which, viewed in the driving direction, has an opening on the front side, and which has a U-profile in cross-section. The parts of the windshield washer device involve, for example, the liquid container and the drive device which are displaced rearward in the event of an impact onto the crash element which, viewed in the driving direction, is located at the front.

In particular, the crash element (also designated as anticlimber) can be a bumper bar (also designated as bumper) which is connected on both sides with its opposite ends to the load-bearing construction via at least one impact absorbing element. In accordance with the usually rounded design of a rail vehicle, the impact bar can be curved convexly. It can preferably be made from metal profiles or as a high-strength, milled aluminum part and—in contrast to the impact absorbing element—is dimensionally stable in the event of a collision with a vehicle or an object. However, the latter preferably also applies in general for any crash element to which the windshield washer device is fastened.

The crash element (in particular the bumper bar) and the at least one impact absorbing element are usually located in the front and the rear regions of the rail vehicle. They are typically arranged at the same height above the rails. In the case of a bumper bar, the impact absorbing elements, viewed in particular in the driving direction, are arranged behind the bumper bar on the lateral ends thereof so that in the event of a collision, the impact forces are transmitted into the impact absorbing elements via the lateral ends of the bumper bar. The impact absorbing elements are pushed against a surface and/or object located behind said impact absorbing elements. Said surface and/or object involve a part or parts of the vehicle body. If the impact absorbing elements can no longer absorb energy, the impact energy is transferred into the vehicle body.

In order that the impact forces can be received in an energy-absorbing manner not only exactly in the direction of the longitudinal axis of the vehicle, also preferably, a guide (in particular with sliding surfaces) is provided which determines the moving direction or a range of moving directions (preferably one or a plurality of horizontal direction(s) opposite to the driving direction) of the crash element in the event of a frontal impact. In particular, said guide effectively absorbs force components caused by diagonal or transverse impacts during force application and, on the other hand, it enables the crash element to move backward due to the impact force.

During the crash, the crash element absorbs the impact forces and impact energy and transfers them to the at least one impact absorbing element which absorbs impact energy and converts it into other forms of energy such as potential energy, heat and deformation energy. In particular, the crash element is connected to the load-bearing construction of the vehicle exclusively through the at least one impact absorbing element. This does not exclude, as it is the case in a preferred embodiment, that the weight of the crash element and of the windshield washer device fastened thereon is at least partially carried by a support of the load-bearing construction along which the crash element can slide during a collision. Moreover, it is conceivable to provide fastenings of the crash element directly on the load-bearing construction, wherein, however, said fastenings break in a predefined manner during a collision. Since the energy required for this process also uses a portion of the impact energy, such predetermined breaking points can also be considered as impact absorbing elements. However, it is preferred that the fastening of the crash element on the load-bearing construction is carried out only through the at least one impact absorbing element.

In particular, the at least one impact absorbing element can be formed from a reversible and/or irreversible stage. Impact absorbing elements can be divided into irreversible and reversible ones, wherein hybrid forms are also possible. In the case of combinations of reversible with irreversible impact absorbing elements, they are also called two-stage impact absorbing elements. In the event of a collision, the reversible impact absorbing elements absorb impact energy but are not plastically deformed, whereas irreversible impact absorbing elements are plastically deformed when absorbing impact energy. Examples for irreversible impact absorbing elements are honeycombed aluminum structures. Reversible impact absorbing elements, for example, are formed from a piston/cylinder unit, wherein the cylinder can be filled with liquid or an elastomer.

In particular, the windshield washer unit can be fastened to the crash element on an upward facing surface of the crash element. In this manner it can be achieved that, for example, in the event of a malfunction, the device can be assembled and disassembled and—if necessary—replaced as an assembly in a simple manner. Thus, the crash element can be arranged at the height position that is usual for rail vehicles. In this case, the windshield washer device is located above the crash element in the height range between the crash element and the front window of the vehicle. Fastening on the upward facing surface has the advantage that the crash surface of the crash element can be configured in the usual manner, and transmitting the impact forces to the impact absorbing elements is not impaired.

Advantageously, the windshield washer device is fastened to the crash element via a one-piece connecting element. Such a one-piece connecting element saves weight and can be designed in a particularly stable manner so as to ensure that the windshield washer device is carried along during the movement of the crash element. Furthermore, for the preferred embodiment described below, in which a portion of the wiper holder is levered away from the front window, it can be ensured that the required forces are transmitted to the windshield washer device. However, it is to be noted that the same advantages also apply to the fastening of the windshield washer device on the crash element via a plurality of one-piece connecting elements. If a plurality of crash elements is provided, the windshield washer device can also be fastened to the different crash elements in each case via one connecting element or in each case via a plurality of connecting elements.

It has already been mentioned above that when installing the front arrangement in a vehicle or on a vehicle, a free space is maintained into which at least parts of the windshield washer device can move when they are carried along by the crash element. In a refinement of the vehicle, the front window wiper device has a wiper arm which extends from a region in front of the front window across an edge of the front window and, while being driven by the drive device, moves in the region in front of the front window along the front window. In the edge region outside of the front window, the vehicle has a protrusion so that during a crash-related force applied to the crash element and a corresponding deflection movement of the crash element and the drive device, the wiper arm strikes against said protrusion and as a result of this, the portion of the wiper arm in the region before the front window is levered away from the front window. Otherwise, the wiper arm and the front window could be damaged during a collision and the associated movement of the crash element.

In particular, in order to ensure that the wiper arm portion is levered away in different movement positions of the wiper arm, the protrusion is preferably configured as an elongated element (e.g. strip) which extends along the edge of the front window. In particular, the surface of the protrusion can be formed by an elastomeric material so that the striking of the wiper arm results in deformation of the elastomeric material, and therefore the wiper arm is protected from damage.

In general, the wiper device can comprise at least one wiper arm and a wiper blade connected thereto, wherein a device (e.g. a drive shaft and/or a gear unit) is coupled to the wiper arm, through which said device the wiper arm can be moved. The wiper arm is driven by the drive device (e.g. an electric motor) and, for this purpose, is mounted to be pivotable relative to the drive device. In addition, it is a frequent practice that, for example, for repairing or cleaning, the wiper arm and the wiper blade can be tilted away, turned away and/or disassembled from the front or rear window of the vehicle. For this purpose, a suitable device is provided on the wiper arm. In the simplest case, this can be a hinge by means of which the wiper arm can be pivoted away from the window. This device facilitates in particular the above-mentioned levering away in the event of a collision.

Figure 2:
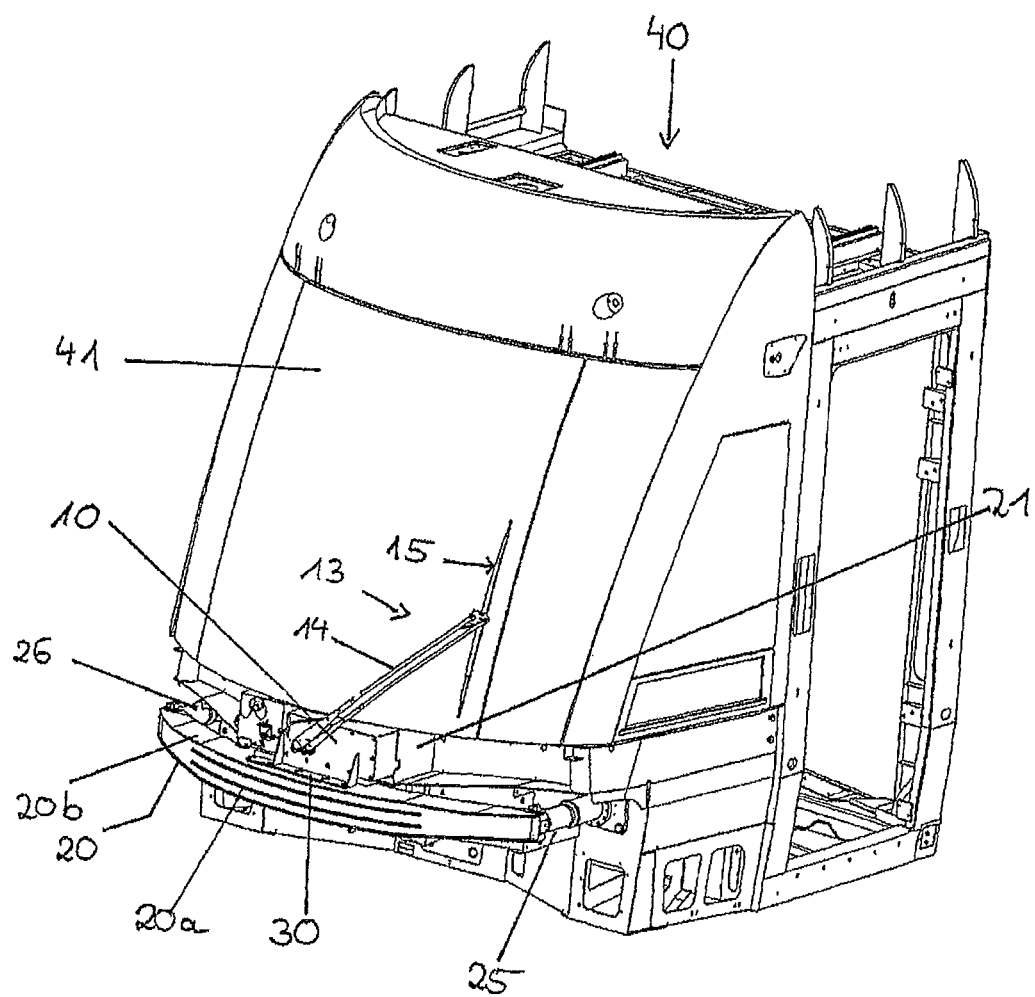
Figure 3:
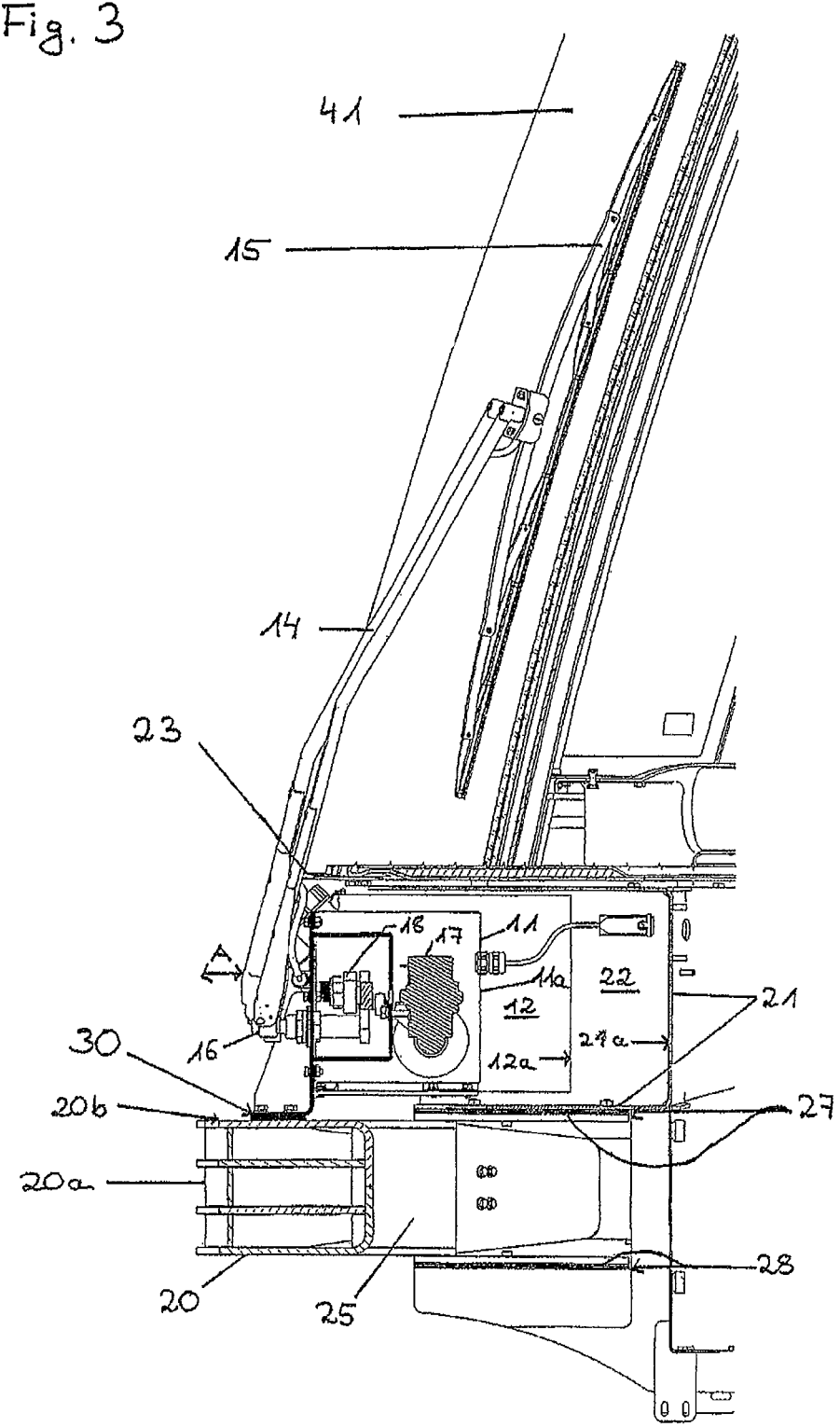

The invention is explained in more detail hereinafter by means of an exemplary embodiment with reference to the drawings. In the figures:

FIG. 1 shows an illustration of a windshield washer device to be installed on a crash element by means of a fastening element which is illustrated as well, FIG. 2 shows a perspective view of a front region (vehicle head) of a rail vehicle comprising the windshield washer device according to FIG. 1 attached on a crash element, and FIG. 3 shows a side view of the front region of the arrangement according to FIG. 2, illustrated in a cross-sectional view.

According to FIG. 1, a windshield washer device 10 has a box-shaped unit 11 which contains a drive device 17 (electric motor) and a gear unit 18 (see FIG. 3). On the drive side, the gear unit is connected to a wiper device 13 consisting of wiper arm 14 and wiper blade 15 so that the wiper arm 14 can be driven by the drive device 11 and can move back and forth along the front window 41. Furthermore, there is a liquid container 12 which can be filled with a cleaning agent so as to be able to clean the front window 41 during the ride. The box-shaped unit 11 and the liquid container 12 are connected to a fastening element 30 which is configured as a one-piece angle profile which can be fastened with its horizontally extending lower leg on the upper surface of a crash element (FIG. 3). Its vertically extending upper leg carries a substantial portion of the weight of the windshield washer device 10, as is shown in FIG. 3; however, the windshield washer device's 10 portion located further back in the driving direction, i.e., the rear region of the box-shaped unit 11 and the liquid container 12 can be slidingly fastened on a base which is part of the load-bearing construction of the vehicle or is directly connected to the load-bearing construction of the vehicle.

FIG. 2 shows the front region of a rail vehicle. In the upper part of the drawing, a front window 41 with a wiper blade 15 resting thereon is shown. The lower part of the drawing illustrates a crash element 20 in the form of a bumper bar which extends convexly curved over a substantial portion of the width of the vehicle head 40 or the rail vehicle. Viewed in the driving direction, the bumper bar 20 is located at the front (or at the back when operated in the opposite direction). The front arrangement is configured such that the bumper bar 20 ends only with a small distance A (see FIG. 3) in front of the wiper arm 14 of the windshield washer device 10. This distance is, e.g., 35 to 45 mm. In the event of a collision, the bumper bar 20 and thus also the windshield washer device 10 perform, e.g., a linear movement of up to 50 mm (linear stroke of the bumper bar). As a result, the wiper arm is levered away from the front window (see below).

At its opposite ends, the bumper bar 20 is fastened in each case to an impact absorbing element 25, 26. In FIG. 2, only one impact absorbing element 25 is clearly shown. The impact absorbing elements 25, 26, e.g., are a two-stage design and are arranged parallel to one another. They absorb impact forces in the longitudinal direction (driving direction) of the vehicle while using up impact energy. In doing so, the bumper bar 20 moves backward opposite to the driving direction. The impact absorbing elements 25, 26, e.g., are formed such that overall (e.g. by reversible and irreversible impact absorbing elements) a linear stroke of 400 mm can be performed while using up impact energy.

On an upward facing surface 20b of the bumper bar 20, the windshield washer device 10 is fastened via the horizontally extending leg of the fastening element 30. Furthermore, a horizontally extending beam 21 of the load-bearing construction of the vehicle is shown, which usually is designated as front girder. Said beam extends at the height of the box-shaped unit 11 and the liquid container 12. In the region of the windshield washer device 10, the beam 21 forms or carries a housing-like receptacle for the windshield washer device 10, wherein the front side of the receptacle space is open. The box-shaped unit 11 and the liquid container 12 protrude partially into the receptacle space. The receptacle space provides a free space 22 (FIG. 3) for a backward movement of the box-shaped unit 11 and the liquid container 12 toward the beam 21. Within the free space 22, the distance of the rear edge 12a of the liquid container 12 from the surface of the beam is, e.g., between 55 and 150 mm, and the distance from the rear edge 11a of the box-shaped unit 11 from the surface of the beam 21 is, e.g., between 150 and 250 mm.

In the event of an impact on the surface 20a of the bumper bar 20, the latter is moved in the direction of the longitudinal axis of the vehicle, i.e., is moved backward relative to the driving direction. The parts 11, 12 of the windshield washer device 10, which are fastened on the surface 20b by means of the fastening element 30, are carried along during the movement and thus also move backward into the free space 22.

FIG. 3 shows a simplified arrangement of the front region, wherein parts of the windshield washer device 10 and load-bearing parts of the rail vehicle are shown in a cross-sectional view. Shown is the condition prior to a collision (crash), i.e., prior to the action of impact forces onto the crash surface 20a of the bumper bar 20.

Shown are the drive device 17 and the gear unit 18, the liquid container 12 as well as the wiper arm 14 and the wiper blade 15 as parts of the wiper device 13. The wiper blade 15 rests against the front window 41. The wiper arm 14 is connected to the drive device 11. At the lower end of the wiper arm, an articulated device 16 is provided which enables the wiper arm 14 to pivot away from the front window 41.

Furthermore, in the lower edge region of the front window 41, a strip 23 is arranged which protrudes in the driving direction beyond the front window and extends at least over a portion of the width of the front window 41. In the event of a crash, the wiper arm 14 strikes against the strip 23 because the wiper arm is carried along by the bumper bar and its upper portion with the wiper blade 15 is levered away from the front window 41.

As is shown in FIG. 3, the receptacle space formed by the beam 21 for the windshield washer device 10 is U-shaped in cross-section. Below the receptacle space, a guide is arranged which has an upper first sliding surface 27 facing downward and a lower sliding surface 28 facing upward. The sliding surfaces 27, 28 are carried, e.g., by the beam 21 or other parts of the vehicle body. The sliding surfaces 27, 28 border a second receptacle space for receiving parts of the bumper bar 20 and/or an impact absorbing element 25 coupled to the bumper bar 20. During a crash of the vehicle resulting in impact forces acting on the crash surface 20a, the bumper bar 20 and the impact absorbing element 25 therefore can move backward counter to the driving direction guided by the sliding surfaces 27, 28.

REFERENCE LIST

10 Windshield washer device
11 Box-shaped unit with drive device
11a Rear edge of the drive device
12 Liquid container
12a Rear edge of the liquid container
13 Wiper device
14 Wiper arm
15 Wiper blade
16 Articulated device
17 Drive device
18 Gear unit
20 Crash element
20a Crash surface of the crash element
20b Upper surface
21 Beam
21a Edge of the component
22 Free space of the component
23 Strip
25 Impact absorbing element
26 Impact absorbing element
27 Sliding surface
28 Sliding surface
30 Fastening element
40 Vehicle head
41 Front window
A Distance

The invention claimed is:

1. A front arrangement for a vehicle comprising a crash element with a forward facing crash surface, and a windshield washer device which comprises a drive device and a front window wiper device drivable by the drive device, wherein the crash element is configured to absorb and transfer impact forces during a crash of a body directly onto the front of the vehicle and thus onto the crash surface of the crash element, and wherein the crash element is coupled with at least one impact absorbing element,
wherein
the windshield washer device is fastened to the crash element and wherein the crash element and the windshield washer device fastened thereto are movable relative to a support of the front arrangement and thus, in a state installed in the vehicle, are movable relative to the load-bearing construction of the vehicle so as to move backward during the occurrence of the impact forces and to enable absorption of an acting impact energy by the at least one impact absorbing element, and
wherein a bumper bar is provided as the crash element and wherein the bumper bar is coupled at opposite ends of the bumper bar to the at least one impact absorbing element.

2. The front arrangement according to claim 1, wherein the windshield washer device is fastened to the crash element on an upward facing surface of the crash element.

3. The front arrangement according to claim 1, wherein the windshield washer device is fastened to the crash element via a one-piece connecting element.

4. A vehicle comprising a front arrangement according to claim 1 arranged in a front region of the vehicle and connected to a load-bearing construction of the vehicle via a support of the front arrangement, wherein, in the direction opposite the driving direction and viewed from a drive device, a free space is available into which, upon occurrence of the impact forces on the crash surface, the drive device diverts.

5. The vehicle according to claim 4, wherein a front window wiper device has a wiper arm which extends from a region in front of a front window across an edge of the front window and, while being driven by the drive device, moves in a region in front of the front window along the front window, wherein in an edge region outside of the front window, the vehicle has a protrusion so that during a crash-related force applied to the crash element and a corresponding deflection movement of the crash element and the drive device, the wiper arm strikes against said protrusion and the portion of the wiper arm in the region in front of the front window is levered away from the front window.

6. A method for fabricating a front arrangement for a vehicle, the method comprising the following steps:
providing a windshield washer device which has a drive device and front window wiper device drivable by said drive device,
providing a crash element with a crash surface, wherein the crash element is configured to absorb and transfer impact forces during an impact of a body directly onto the front of the vehicle and onto the crash surface of the crash element, coupling the crash element with at least one impact absorbing element, fastening the windshield washer device to the crash element, and configuring the crash element and the windshield washer device fastened thereto as a unit movable relative to a support of the front arrangement and, in a state installed in the vehicle, movable relative to the load-bearing construction of the vehicle so as to move backward during the occurrence of the impact forces and to enable absorption of an acting impact energy by the at least one impact absorbing element, wherein a bumper bar is provided as the crash element and wherein the bumper bar is coupled at opposite ends of the bumper bar to the at least one impact absorbing element.

7. The method according to claim 6, wherein the front arrangement is arranged in a front region of the vehicle and is connected to the load-bearing construction of the vehicle via the support of the front arrangement, and, wherein in the direction opposite the driving direction and viewed from the drive device, a free space is made available into which, upon occurrence of the impact forces on the crash surface, the drive device diverts.

8. The method according to claim 6, wherein a wiper arm is provided for the front window wiper device and is arranged in such a manner that the wiper arm extends from a region in front of the front window across an edge of the front window and, while being driven by the drive device, moves in the region before the front window along the front window, wherein in the edge region outside of the front window, a protrusion is provided on the vehicle so that during a crash-related force applied to the crash element and a corresponding deflection movement of the crash element and the drive device, the wiper arm strikes against said protrusion and a portion of the wiper arm in the region before the front window is levered away from the front window.

9. A method for operating a vehicle comprising the steps of:

during a crash of a body absorbing impact forces acting directly onto a front of the vehicle and onto a crash surface of a crash element by the crash element, transferring the impact forces to at least one impact absorbing element coupled with the crash element, wherein the crash element moves toward the at least one impact absorbing element, and transmitting the movement of the crash element to a windshield washer device which comprises a drive device and a front window wiper device drivable by said drive device so that at least the drive device and further parts of the windshield washer device are moved away from the body, wherein a bumper bar is provided as the crash element and wherein the bumper bar is coupled at opposite ends of the bumper bar to the at least one impact absorbing element.

\* \* \* \* \*